United States Patent
Kumaresh et al.

(10) Patent No.: US 10,225,166 B2
(45) Date of Patent: Mar. 5, 2019

(54) USER PRIORITIZATION IN A CONGESTED NETWORK

(71) Applicant: Telefonaktiebolaget L M Ericsson (publ), Stockholm (SE)

(72) Inventors: V S Kumaresh, Chennai (IN); T Balamurugan, Chennai (IN); JayaKrishnan Kizhakke Pullarappillil, Cochin (IN); Saravanan Mohan, Chennai (IN); P. V. K. Ravikumar, Chennai (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 774 days.

(21) Appl. No.: 14/485,179

(22) Filed: Sep. 12, 2014

(65) Prior Publication Data
US 2016/0080275 A1    Mar. 17, 2016

(51) Int. Cl.
*H04L 12/851* (2013.01)
*H04L 12/26* (2006.01)
(Continued)

(52) U.S. Cl.
CPC ........ *H04L 43/062* (2013.01); *H04L 43/0876* (2013.01); *H04L 47/11* (2013.01);
(Continued)

(58) Field of Classification Search
CPC ....... H04L 43/062; H04L 47/11; H04L 47/24; H04L 41/5035; H04L 43/0876; H04L 41/5025
See application file for complete search history.

(56) References Cited

U.S. PATENT DOCUMENTS 7,142,507 B1 * 11/2006 Kurimoto ........... H04L 12/2602
                                                370/229
8,346,881 B1 *  1/2013 Cohen .................. G06Q 10/107
                                                709/224
(Continued)

OTHER PUBLICATIONS

3GPP, "3rd Generation Partnership Project; Technical Specification Group Core Network and Terminals; Policy and Charging Control (PCC); Reference points (Release 12)", 3GPP TS 29.212 V12.5.2, Jul. 2014, 1-222.
(Continued)

*Primary Examiner* — Wing F Chan
*Assistant Examiner* — Billy H Ng
(74) *Attorney, Agent, or Firm* — Murphy, Bilak & Homiller, PLLC (57) ABSTRACT

A behavior investigating device of a system investigating arrangement in a communication network continuously obtains statistical network usage data of users, analyzes the statistical network usage data with regard to the pattern of behavior of the users, prioritizes the users based on the analysis and informs a traffic prioritizing function about the priority of at least one of the users. The traffic prioritizing function, which may be provided in the traffic prioritizing node, determines that there is network congestion, identifies a communication session of a user in the communication network, obtains a priority of the user from a behavior investigating device and determine whether the user is to be allowed to use the communication network based on the priority and the congestion determination.

11 Claims, 6 Drawing Sheets (51) Int. Cl.
*H04L 12/801* (2013.01)
*H04L 12/24* (2006.01)

(52) U.S. Cl.
CPC .......... *H04L 47/24* (2013.01); *H04L 41/5025* (2013.01); *H04L 41/5035* (2013.01)

(56) References Cited

U.S. PATENT DOCUMENTS

| | | | | |
|---|---|---|---|---|
| 8,553,545 | B2* | 10/2013 | Lee | H04L 47/12 370/232 |
| 2004/0172470 | A1* | 9/2004 | Shiina | H04L 29/06 709/224 |
| 2006/0120282 | A1* | 6/2006 | Carlson | H04L 12/2602 370/229 |
| 2009/0109847 | A1* | 4/2009 | Stephenson | H04L 47/10 370/232 |
| 2010/0145771 | A1* | 6/2010 | Fligler | G06Q 10/10 705/319 |
| 2011/0244872 | A1* | 10/2011 | Quinn | G06F 17/30867 455/445 |
| 2012/0020218 | A1* | 1/2012 | Li | H04L 43/067 370/235 |
| 2012/0102415 | A1* | 4/2012 | Deng | G06Q 10/109 715/753 |
| 2012/0278472 | A1* | 11/2012 | Ellis | H04L 12/1407 709/224 |
| 2013/0051332 | A1* | 2/2013 | Sridhar | H04W 48/06 370/329 |
| 2013/0072259 | A1* | 3/2013 | Kusano | H04W 28/08 455/561 |
| 2014/0047071 | A1* | 2/2014 | Shehada | H04L 65/4084 709/219 |
| 2014/0095706 | A1* | 4/2014 | Raleigh | H04L 41/0893 709/224 |
| 2014/0297580 | A1* | 10/2014 | Javarappa | G06F 17/30 706/52 |
| 2017/0078949 | A1* | 3/2017 | Tanaka | H04W 48/02 |

OTHER PUBLICATIONS

3GPP, "3rd Generation Partnership Project; Technical Specification Group Core Network and Terminals; Policy and Charging Control: Spending Limit Reporting over Sy reference point (Release 12)", 3GPP TS 29.219 V12.2.0, Jun. 2014, 1-22.

Hakala, H. et al., "Diameter Credit-Control Application", The Internet Society, Network Working Group, Request for Comments 4006, Aug. 2005, 1-104.

* cited by examiner

USER PRIORITIZATION IN A CONGESTED NETWORK

TECHNICAL FIELD

The invention relates to communication networks. More particularly, the invention relates to a method for investigating the behavior of users in a communication network and a system investigating arrangement in such a communication network as well as to a method for prioritizing traffic in a communication network and a traffic prioritizing node.

BACKGROUND

Communication networks, such as mobile communication networks have increased in popularity for using a wide variety of services. These networks are then often operated by an operator and include a number of nodes cooperating for rendering the services to users of the network.

Some nodes in a mobile communication network that are involved in such service rendering are Online Charging System (OCS) node, Policy Control Rule Function (PCRF) node and Gateway GPRS Support Node (GGSN), where GPRS is an acronym for General Packet Radio Service. A GGSN node may here also comprise a Policy and Charging Enforcement Function (PCEF). Another node that may exist in the system is a Mobile Switching Centre (MSC).

The nodes PCRF, GGSN (including PCEF) and OCS are mainly responsible for rendering and charging end user data services. When a user of the communication network tries to access the Internet or another data service as provided by the operator, GGSN establishes one policy and one charging session with PCRF and OCS, respectively. PCEF in-turn gets the required information of the user from OCS. Similar functions exist for traditional voice services, where an MSC interacts with OCS for reservations and charging of accounts based on service usage.

OCS allows a telecommunication service provider to charge its customers in real time based on service usage. The functions within the OCS include both event and session based charging for various services like voice, data etc. The OCS receives traffic from different core network elements (like PCRF, GGSN, MSC etc.) to charge for the service usage at real-time.

In operator networks though, the network capacity is rightly dimensioned in most cases, so the capacity will not be surplus in general. The network capacity is generally dimensioned by estimating peak traffic (during peak hours) generated by network users during a normal day (excluding festive days). However provisioning (and de-provisioning) of new users into a network is a daily routine (especially in emerging markets where subscriber acquisition is still a big thing) and in general network elements are not expanded that often. Hence, it is possible that during peak hours some of the network elements involved in the chain of service-rendering may enter into overload situations, causing rejection of traffic.

Requests for communication in the case of congestion in a network element can be denied by many of these nodes, for instance by OSC, PCRF and GGSN. Furthermore, the users of the network may not be equal. Some may be more important than others for a variety of reasons. In the case of congestion, there is today no way to differentiate between different users based on importance.

OCS does for instance handle traffic based only on the rate plans or products associated to a user. There is thus no consideration of how important the user may be in the network. There is no prioritization being made with respect to the user.

Today OCS has no intelligence to take into account a user-priority when making a decision. Especially during congestion, general load regulation/congestion control mechanisms cater for rejecting a percentage of traffic or a particular type of traffic till load comes down to a decent level. There could therefore be transactions/sessions related to users deemed to be important that will be rejected during this period.

Hence, during traffic congestion, there always exists a possibility that a low-value user is served over a highly valued user.

A first type of highly valued user may be a user that is economically important to the operator. It may be a user that has a high usage rate and/or a high billing rate. It may also be a user that is loyal or is influential, where an influential user may have a high number of followers in social networks. A second type of highly valued user may be a user involved in important work in society, such as a doctor, an ambulance driver or a fireman.

If a highly valued user of the first type gets rejected, this user may have a negative user experience, which may lead to decreased loyalty and a high churn rate in the network causing a loss in revenue for the service provider. A highly valued user of the second type may also churn; however, this user may also be unable to communicate vital information at a time when this is important. This may in turn be dangerous, depending on the situation that the user is involved in.

Therefore, there is a need for allowing prioritization between users in a communication network, where one or more network elements are experiencing congestion.

SUMMARY

One object of the invention is to provide a user priority that can be used for prioritizing traffic in a communication network when there is congestion.

This object is, according to a first aspect, achieved by a system investigating arrangement in a communication network. The system investigating arrangement comprises a behavior investigating device. The behavior investigating device comprises a processor acting on computer instructions whereby the behavior investigating device is operative to provide a usage pattern investigation function. The usage pattern investigation function continuously obtains statistical network usage data of users in the communication network, analyzes the statistical network usage data with regard to the pattern of behavior of the users, prioritizes the users based on the analysis and informs a traffic prioritizing function about the priority of at least one of the users in order for the traffic prioritizing function to allow or disallow the user to use the communication network when it is congested.

This object is, according to a second aspect, also achieved by a method for investigating the behavior of users in a communication network. The method is performed in a system investigating arrangement in the communication network and implements a usage pattern investigating function. The usage pattern investigating function comprises continuously obtaining statistical network usage data of users in the communication network, analyzing the statistical network usage data with regard to the pattern of behavior of the users, prioritizing the users based on the analysis, and informing a traffic prioritizing function about the priority of at least one of the users in order for the traffic prioritizing function to allow or disallow the user to use the communication network when it is congested.

The object is, according to a third aspect, achieved through a computer program product for investigating the behavior of users in a communication network. The computer program product is provided on a data carrier and comprises computer program code which when run in a system investigating arrangement in the communication network, causes the system investigating arrangement to implement a usage pattern investigation function. The usage pattern investigating function is configured to continuously obtain statistical network usage data of users in the communication network, analyze the statistical network usage data with regard to the pattern of behavior of the users, prioritize the users based on the analysis, and inform a traffic prioritizing function about the priority of at least one of the users in order for the traffic prioritizing function to allow or disallow the user to use the communication network when it is congested.

In an advantageous variation of the first and second aspects, the usage pattern investigation function, when being configured to inform the traffic prioritizing function, is configured to send data about priorities at regular recurring intervals. In another variation of the first and second aspects, the usage pattern investigation function sends an initial set, with the priorities of all the users, when sending data, and thereafter sends updates of the set. In a further variation of the first and second aspects, the usage pattern investigation function, when informing the traffic prioritizing function, receives a request for priority concerning a user from the traffic prioritizing function and responds to the request with the priority. In yet another variation of the first and second aspects, the usage pattern investigation function, when analyzing the statistical network usage data with regard to the pattern of behavior of a user, fetches statistical network usage data from session data records and forms a score as a combination of different types of data in the session data records, and when prioritizing the users based on the analysis, forms a priority for the user based on the score.

There may exist different types of scores with regard to different aspects of user behavior. According to the first and second aspects, the usage pattern investigation function, when forming a priority based on a score, furthermore forms the priority as a combination of different scores.

There may also be several traffic prioritizing nodes performing different activities in the communication network, each comprising a traffic prioritizing function. According to the first and second aspects, the usage pattern investigation function, when informing a traffic prioritizing function about the priority of at least one of the users, may furthermore inform each traffic prioritizing node.

It is furthermore possible that the system investigating arrangement and method comprises the traffic prioritizing function, which determines that there is congestion, obtains the priority of at least one user, and determines whether the user is to be allowed to use the communication network based on priority and the congestion determination.

In one variation of the first aspect, the traffic prioritizing function is provided in the behavior investigating device. In another variation of the first aspect, the traffic prioritizing function is provided in a traffic prioritizing node.

Another object is to prioritize traffic in a communication network based on user priority. This object is, according to a fourth aspect, achieved through a traffic prioritizing node in a communication network. The traffic prioritizing node comprises a processor acting on computer instructions, whereby the traffic prioritizing node is operative to provide a traffic prioritizing function. This traffic prioritizing function determines that there is network congestion, identifies a communication session of a user in the communication network, obtains a priority of the user from a behavior investigating device, where the priority has been determined based on a pattern of behavior of the user obtained through analysis of statistical network usage data, and determines whether the user is to be allowed to use the communication network, based on the priority and the congestion determination.

The object is, according to a fifth aspect, achieved through a method of prioritizing traffic in a communication network. The method is performed in a traffic prioritizing node and implements a traffic prioritizing function. The traffic prioritizing function comprises determining that there is network congestion, identifying a communication session of a user in the communication network, obtaining a priority of the user from a behavior investigating device, where the priority has been determined based on a pattern of behavior of the user obtained through analysis of statistical network usage data, and determining whether the user is to be allowed to use the communication network, based on the priority and the congestion determination.

The object is, according to a sixth aspect, achieved through a computer program product for prioritizing traffic in a communication network. The computer program product is provided on a data carrier and comprises computer program code that, when run in a traffic prioritizing node in the communication network, causes the traffic prioritizing node to implement a traffic prioritizing function. The traffic prioritizing function determines that there is network congestion, identifies a communication session of a user in the communication network, obtains a priority of the user from a behavior investigating device, where the priority has been determined based on a pattern of behavior of the user obtained through analysis of statistical network usage data, and determines whether the user is to be allowed to use the communication network, based on the priority and the congestion determination.

The session may be a new session to be set up. According to one variation of the fourth and fifth aspects, the traffic prioritization function may then investigate the session through obtaining a request to use the communication network from the user and thereafter investigate the priority in relation to this request and determine whether the session may be initiated. Alternatively, the session may be an ongoing session handled by the node. According to another variation of the fourth and fifth aspects, the traffic prioritization function may then investigate the priority in relation to this ongoing session and then determine whether the session is allowed to continue.

The invention, according to the above-mentioned aspects, has a number of advantages. It allows prioritizing of traffic based on user priority when there is congestion. This gives an enhanced user experience for users that are important in the communication network.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

Figure 1:
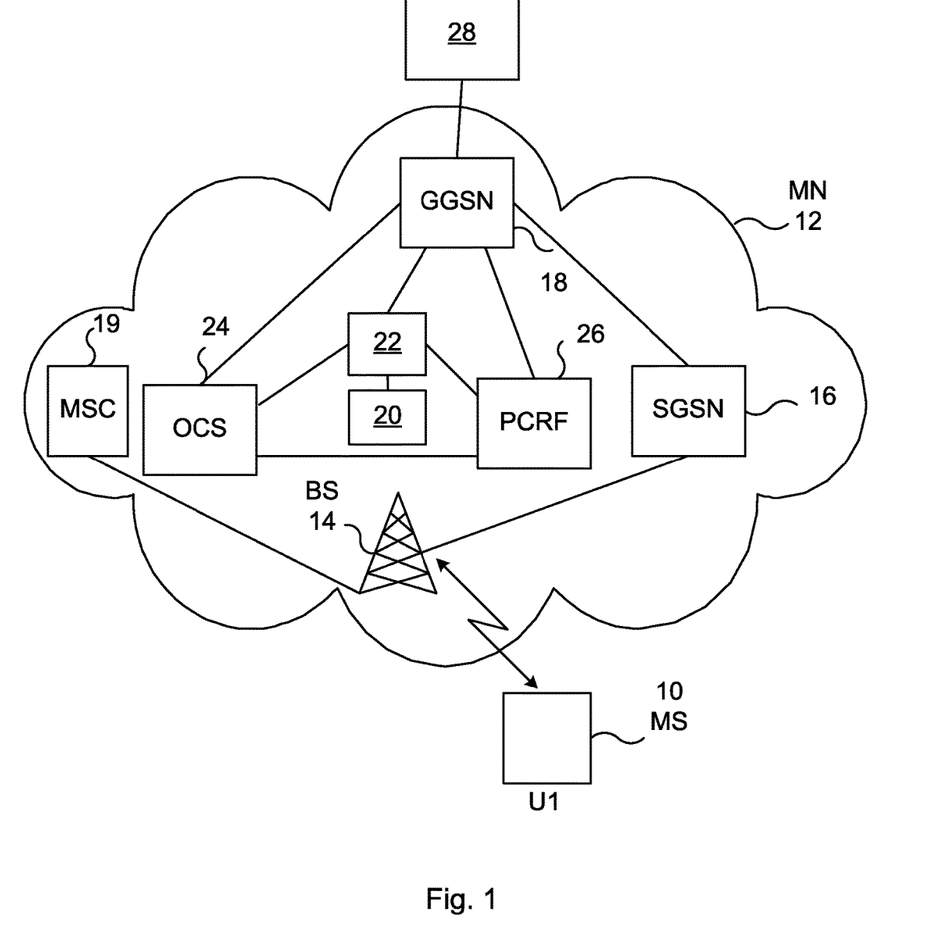
FIG. 1 schematically shows a user that wants to communicate with another entity via a communication network as well as various nodes in the communication network.

FIG. 1 schematically shows a communication network, which in the present example is a telecommunication network. Furthermore, the communication network 10 is in this case a mobile communication network MN 14 comprising a base station BS 12 connected to a serving GPRS Support Node (SGSN) 16, where GPRS is an acronym for General Packet Radio Service. The SGSN 16 is in turn connected to a Gateway GPRS Support Node (GGSN) 18 in order to allow communication with entities outside of the network 12. The GGSN 18 is shown as being connected to one such external entity 28. There is furthermore an Online Charging System (OCS) node 24 and a Policy Control Rule Function (PCRF) node 26, where both are connected to the GGSN 19 as well as to each other. There is also a Mobile Switching Centre (MSC) node 19 connected to the base station 12 as well as to the OCS node 24. In the mobile communication network 12 there is also a behavior investigating device 22 connected to an associated database 20. The behavior investigating device 22 is connected to the OCS 24, the PCRF 26 and the GGSN 18. It should be realized that the mobile communication network 12 may comprise several more devices, for instance more SGSNs, GGSNs and base stations. The mobile communication network 12 may furthermore be a network allowing Internet connectivity such as Long Term Evolution (LTE) or Wideband Code Multiple Access (WCDMA).

Aspects of the invention will, in the following, be described in relation to the mobile communication network 12. However, the invention is not limited to being applied in a mobile communication network, but may, for instance, be applied in a Public Switched Telecommunication Network (PSTN) or any type of communication network such as a computer communication network.

The MSC 19 is the centerpiece of a network switching subsystem (NSS). The MSC is mostly associated with communications switching functions, such as call set-up, release, and routing. However, it also performs a host of other duties, including routing SMS messages, conference calls, fax, and service billing, as well as interfacing with other networks, such as the public switched telephone network (PSTN).

The GGSN 18 is a main component of the mobile communication network. The GGSN 18 is responsible for the inter-networking between the mobile communication network 12 and external packet switched networks. From an external network's point of view, the GGSN 18 is a router to a "sub-network", because the GGSN 'hides' the mobile network infrastructure from the external network. The GGSN 18 is also responsible for performing authentication and charging functions with the OCS 24. This may be done via a so-called Gy interface between the two nodes that uses diameter (AAA functionality) protocol.

The OCS node 24 handles billing. As opposed to a traditional billing system, OCS 24 is oriented to all subscriber types and service types and therefore offers unified online charging and online control capabilities and can be used as a unified charging engine for all network services, making it a core basis for convergent billing in the network 12. Its architecture may support event-based charging (diameter-sms or diameter-mms), session-based charging function (voice calls or IMS sessions), account and balance management (location of the subscriber's account balance within the OCS), and rating function (value of the network resource usage based on charging events)

The PCRF node 26 is a software node designated in real-time to determine policy rules in a multimedia network. Unlike earlier policy engines that were added onto an existing network to enforce policy, the PCRF 16 is a software component that operates at the network core and accesses subscriber databases and other specialized functions, such as a charging system, in a centralized manner. The PCRF 26 is the part of the network architecture that aggregates information to and from the network, operational support systems, and other sources (such as portals) in real time, supporting the creation of rules and then automatically making policy decisions for each user active on the network 12. Thereby the network 12 might offer multiple services, quality of service (QoS) levels, and charging rules.

The base station 14, which is often termed eNodeB or just NodeB, is furthermore provided in a part of the mobile communication network 12 termed access network or radio access network, while the other devices are provided in a part of the mobile communication network 12 termed a core network.

A user U1 of the mobile communication network 12 is furthermore equipped with a terminal 10, often termed a mobile station MS, via which he or she may communicate with other users and entities via the mobile communication network 12. The user U1 may, for instance, want to communicate with the external entity 28, for which a communication session may be set up via the base station 14, SGSN 16 and GGSN 18. A session may here be any type of communication such as a session involving a web browser used to visit a social media site. The user may also want to involve in a voice session, in which case, the session may in some situations instead be set up via the MSC 19.

Figure 2:
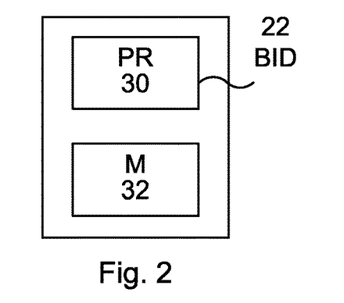
FIG. 2 shows a block schematic of a first way of realizing a behavior investigating device in the communication network.

FIG. 2 shows a block schematic of a first way of realizing the behavior investigating device BID 22. It may be provided in the form of a processor PR 30 connected to a program memory M 32. The program memory 32 may comprise a number of computer instructions implementing the functionality of the behavior investigating device 22 and the processor 30 implements this functionality when acting on these instructions. The functionality that is provided may comprise a usage pattern investigation function. It can thus be seen that the combination of processor 30 and memory 32 provides the behavior investigating device 22.

Figure 3:
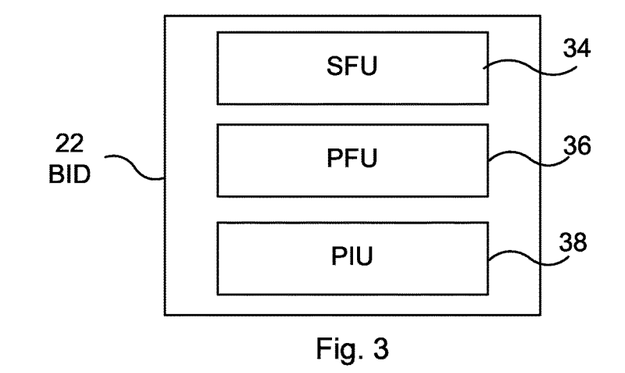
FIG. 3 shows a block schematic of a second way of realizing the behavior investigating device in the communication network.

FIG. 3 shows a block schematic of a second way of realizing the usage pattern investigation function of the behavior investigating device 22. The behavior investigating device 22 may comprise a Score Forming Unit SFU 34, a Priority Forming Unit PFU 36 and a Priority Informing Unit PIU 38. Together these units provide a usage pattern investigating function.

One or each of the OCS node 24, PCRF node 26 or GGSN node 18 is a traffic handling node. However, each of them may also implement traffic prioritizing. They may therefore also be traffic prioritizing nodes. That means a traffic handling node functioning as a traffic prioritizing node will, in addition to performing traffic handling, also perform traffic prioritizing.

Figure 4:
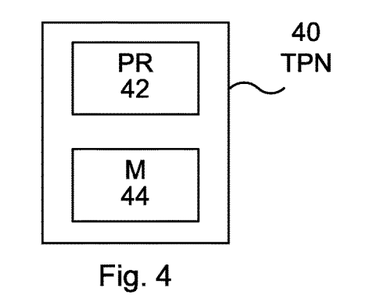
FIG. 4 shows a block schematic of a first way of realizing a traffic prioritizing node in the communication network.

FIG. 4 shows a block schematic of a first way of realizing the traffic prioritizing functionality of a traffic prioritizing node TPN 40. The traffic prioritizing node 40 may be provided in the form of a processor PR 42 connected to a program memory M 44. The program memory 44 may comprise a number of computer instructions implementing the functionality of the traffic prioritizing node 40 and the processor 42 implements this functionality when acting on these instructions. It can thus be seen that the combination of processor 42 and memory 44 provides a traffic prioritizing function in the traffic prioritizing node 22.

Figure 5:
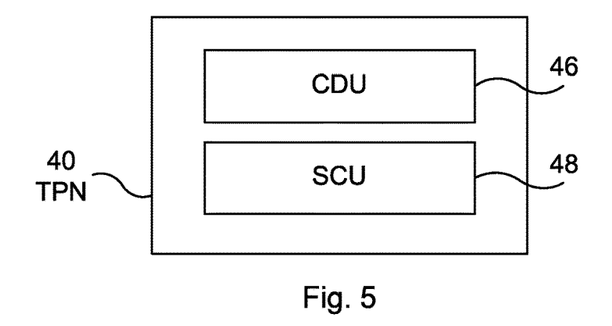
FIG. 5 shows a block schematic of a second way of realizing the traffic prioritizing node in the communication network.

FIG. 5 shows a block schematic of a second way of realizing the traffic prioritizing functionality of the traffic prioritizing node 40. The traffic prioritizing node 40 may comprise a Congestion Determining Unit CDU 46 and a Session Control Unit SCU 48.

The elements in FIGS. 3 and 5 may be provided as software blocks for instance as software block in a program memory, but also as a part of dedicated special purpose circuits, such as Application Specific Integrated Circuits (ASICs) and Field-Programmable Gate Arrays (FPGAs). It is also possible to combine more than one element in such a circuit.

As mentioned earlier, the user U1 of the mobile communication network 12, which user U1 may be a subscriber, may want to communicate in a communication session via the communication network 12. This may also happen when one or more of the traffic handling nodes OCS 24, GGSN 18 and PCRF 26 are experiencing congestion. Now, the user U1 may be a user that for some reason is important to the operator of the network 12. He or she may be economically important to the operator. It may be a user that has a high usage rate or a high billing rate. The user may also be a loyal or influential user, such as a user that has been a subscriber for a long time or has a high number of followers on social media. The user may also be important because he or she is involved in important work in society, such as being a doctor, an ambulance driver or a fireman.

If any of OCS 24, GGSN 18 or PCRF 26 do experience that there is congestion, for instance through their CPU usage levels being high, they may decline communication requests made by users. Traditionally, this declining has been made without considering the importance of the user.

Aspects of the invention address this situation. One way in which this is addressed is through the use of a behavior investigating device that communicates with a traffic prioritizing node. The behavior investigating device is furthermore a part of a system investigating arrangement. In some instance the system investigating arrangement only comprises the behavior investigating device. In other instances the system investigating arrangement also comprises the traffic prioritizing node. In yet other instances there are several traffic prioritizing nodes performing different activities in the communication network, each comprising a traffic prioritizing function.

Furthermore, the usage pattern investigating function provided by the behavior investigation device communicates with the traffic prioritizing function implemented through the congestion determining unit and session control unit. These two functions may be placed in different nodes and thus also in different devices. However, in other instances the two functions are provided in the same device, in the behavior investigating device.

Figure 6:
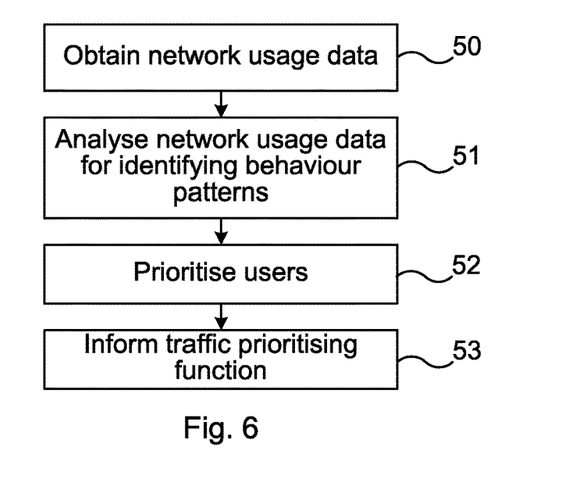
FIG. 6 shows a flow chart of method steps in a method for investigating the behavior of users in the communication network according to a first embodiment.
Figure 7:
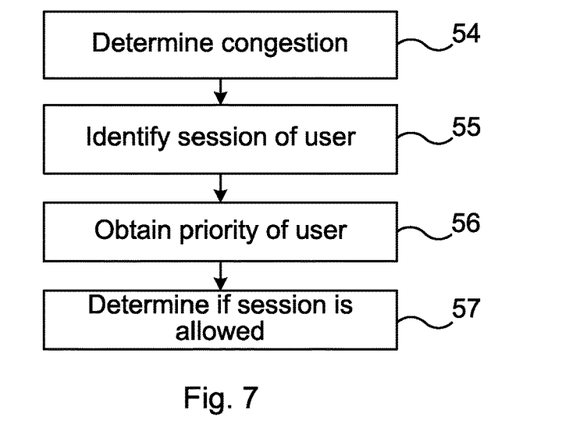
FIG. 7 shows a flow chart of method steps in a method for prioritizing traffic in the communication network according to the first embodiment.

Now a first embodiment will be described with reference being made also to FIGS. 6 and 7, where FIG. 6 shows a flow chart of method steps in a method for investigating the behavior of users in the communication network and being performed in the behavior investigating device 22, while FIG. 7 shows a flow chart of method steps in a method for prioritizing traffic being perform in a traffic prioritizing node. Furthermore, as was mentioned earlier, the units of the behavior investigating device 22 together provide a usage pattern investigation function, which function is used to determine priorities for the users and provide these priorities to the traffic prioritizing function provided by the congestion determining unit and session control unit.

The behavior investigating device 22 may be integrated with a service data point (SDP) and communicate with other nodes to gather real-time information about every user.

In order to perform prioritizing, the behavior investigating device 22 continuously obtains statistical network usage data of users in the communication network, step 50, i.e., it obtains statistical data about network usage in the communication network 12 with regard to the different users. The gathered data may range from mobility to individual profiles (sensitive personal information) that give valuable knowledge to the operator (such as the current trend of the market). The statistical network usage data may comprise Session Data Records (SDRs), which are sometimes also referred to as call data records (CDRs).

Different traffic handling nodes in the network may record every event that is happing in the network per user. These recording are then reported as the above-mentioned SDRs. The SDRs are typically sent to Mediation systems so that they can be processed and sent to other systems like Analytics or Revenue Assurance Systems for further processing. In aspects of the invention SDRs are also constantly received and processed by the behavior investigating device 22.

The network data, for instance in SDRs, may comprise session specific data such as data about actual communication sessions set up between a user and other entities, such as other users, social media sites etc. In relation to the first user U1, the communication network 20 may for instance collect data of the calls made by him or her, the messages sent by him or her as well as other types of activities, such as file transfers to different servers and social media sites visited.

Such SDRs may be collected by all the different core network nodes. The MSC 19, the OCS 24, the PCRF 26 and GGSN 18 may for instance all provide such records on sessions performed by all users in the communication network 12. The records may also be provided to the behavior investigating device 22, which in turn stores them in the database 20. Alternatively the different nodes that collect SDRs may themselves directly store them in the database 20.

The score forming unit 34 may also obtain other types of statistical network usage data than SDRs. It may for instance obtain subscription data about the subscription of the user from a subscription database. The data obtained this way may comprise service rates and the age of subscription. The score forming unit 34 may thus continuously access such SDRs with respect of each user in the network in order to be able to prioritize them.

The score forming unit 34 may furthermore analyze the statistical network usage data, including the data of the SDRs, in order to identify behavior patterns of the users, step 51. It thus analyzes the statistical network usage data with regard to the pattern of behavior of the users. The data may be operated upon by several algorithms (like influential user detection algorithm) to disclose the characteristics of various individuals (like average money the user spends per month) existing in the network in the form of a score. The pattern identified can be that patterns of use of the different services, such as if a user is making many phone calls, sending many messages, and/or connecting a lot to social media sites, and spending SDRs may also be analyzed in order to find out which friends the user U1 contacts as well as how frequent and how long such sessions with friends are.

The score forming unit 34 may more particularly form a score for an aspect of user behavior. There may be one score for how loyal a user is, another score for how much the user spends in the system, a further score indicating how influential the user is and another how important the role of the user is, like if he or she is a firefighter or ambulance driver. It is to be noted that the score forming unit 34 may asynchronously calculate and hold the score of every user located at the particular SDP with which the behavior investigating device 22 is integrated, and update the score in regular intervals of time.

Based on the analysis, and more particularly based on the analyzed data, such as on the scores, the priority forming unit 36 then prioritizes the users, step 52. The prioritizing may involve forming a priority through combining different scores. A priority may also be based on only one or only a few scores. In this way each user is assigned a value or priority that represents the importance in the communication network.

Once all the users have been prioritized, the priority informing unit 38 informs one or more of the traffic prioritizing functions about the priority, step 53. It may more particularly inform one or more traffic prioritizing nodes about the priority of at least one of the users in order for the traffic prioritizing function to allow or disallow the user to use the communication network when it is congested. It will typically inform of priorities in order for the traffic prioritizing nodes to allow or disallow users to use the communication network 12 in the case of congestion.

There are several ways in which this informing may be performed. The behavior investigating device 22 may inform all nodes that have the capability of performing prioritization. It may also inform one or a few of the nodes, for instance a node involved in handling communication sessions. It may for instance only inform to the OCS node 24.

The informing may be made through send data about priorities at regular recurring intervals. In this case it is also possible to first send an initial set with the priorities of all the users and thereafter send updates of the set. This may be done in batches, where traffic prioritizing nodes are informed about all priorities in a batch so that they can directly determine how to handle a user involved or to be involved in a communication session, which priorities are then updated with later batches. As an alternative it is possible that priorities are delivered one-by-one on request to traffic prioritizing functions. In this case the usage pattern investigation function receives a request for priority concerning a user from a traffic prioritizing node and responds to the request with the priority.

As an example, a traffic prioritizing function may handle a received priority in the following way:

One pre-requisite for the prioritizing is that there is congestion. The congestion determining unit 46 of a traffic prioritizing node 40 may therefore determine that there is congestion, step 54. This determination may be made through investigating the load on the node itself, such as through investigating the Central Processing Unit (CPU) usage. If the CPU usage exceeds a congestion threshold, the congestion determining unit 46 may determine that the node experiences congestion.

If there is congestion, then it is not possible to handle all requests for or ongoing communication sessions. Therefore, the congestion determining unit 46 informs the session control unit 48, which then performs session control of communication sessions. The sessions being candidates for being disallowed may be new sessions being set up. However, there may also be ongoing sessions, which are then prematurely terminated. The session control unit 48 therefore identifies a communication session of a user in the communication network, step 55, which session may thus be a session that is to be set up or is already ongoing. In case the session is a new session the identification may be made through obtaining a request from the user to use the communication network. An existing session handled by the node may be identified via a user identifier, such as a Mobile Station International Subscriber Directory Number (MSISDN). The session control unit 48 then obtains the priorities of the user from the behavior investigating device, step 56, where the priority thus was determined based on a pattern of behavior of the user obtained through analysis of statistical network usage data. In case the session was a new session the priority is the priority associated with the request to use the communication network and if the session is an ongoing session the priority is the priority obtained in relation to this ongoing session. The priority may be obtained through sending a request to the behavior investigating device 22 or through looking at a previously received and locally stored priority of the user. The session control unit 48 then determines whether the user is allowed to use the communication network based on the priority and the previously mentioned congestion determination, step 57.

It can in this way be seen that when there is congestion, a user is prioritized based on how important he or she is. This gives an enhanced user experience for users that are important in the communication network. This improved user-experience may greatly enhance the satisfaction of the high-value user.

Now there will follow a more detailed description on how the priorities may be formed. This will be made with reference being made to FIG. 8, which shows a flow chart of a number of method steps for forming a priority.

Figure 8:
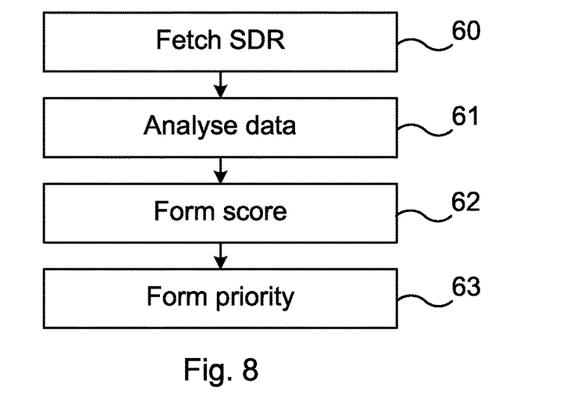
FIG. 8 shows a flow chart of method steps for the setting of priorities of users, FIG. 9 schematically shows one way in which some nodes in the communication network may receive user priorities for traffic prioritization.

The score forming unit 34 computes different users' scores based on certain dimensions from the collected network usage data such as information via events like SDRs produced by different network elements serving the user, such as the OCS 24, the GGSN 18 or the PCRF 26.

The score forming unit 34 may then fetch or extract statistical network usage data from these records. It may, for instance, extract data about spending on operator services, information about social community sites visited, and/or the identity of the user at such a social community sites, as well as information about other users or phones number contacted. It may also obtain information on how long a user has been associated with the network. This information is not necessarily included in a SDR but may be found out through investigating a Home Location register (HLR) or the subscription of a user.

As an example, the following parameters may be obtained via the SDRs
Usage of service (U)
Spending on a particular service (S)
Frequency of contacting contacts/friends (F)
Duration of call on an average to frequent contacts (D)
Location of frequent contacts (L)
Which time of the day calls are made (T)

The collected and extracted data may then be analyzed in order to be able to form a score, step 61. The analysis of social community sites may involve investigating a site to see how many followers the user has there. It may also involve investigating the number of persons called. Both of these things may be used for analyzing the social network behavior of the user. The analysis may also involve investigating the usage pattern of the services of the network, like frequency and mixture of services.

Yet another analysis may involve finding out whether the numbers called by a user are associated with a hospital, fire station or other similar locations. Another investigation may be an investigation of the social media sites to determine whether many of the friends there are medical staff or fire fighter staff.

After having analyzed the data, the score forming unit 34 may form different scores, step 62. There may here be different types of scores with regard to different aspects of user behavior. The score forming unit 34 may for instance form the scores below:

Loyalty Score/Segment: Users can be segmented as in High-Loyal or Low-loyal based on the association (duration) that a user has with operator
Influential Score/Segment: Users can be segmented as in High-Influencer or Low-Influencer based on his/her social network behavior
Average Revenue per User (ARPU) Score/Segment: Users can be segmented as in High-ARPU and Low-ARPU based on the average spend of the users on operator services
Churn Score/Segment: Users can also be segmented into High-Churners and Low-Churners based on their exhibited usage pattern of services
Role Score/Segment: Users can also be segmented based on services they render or services accessed based on user-profile or community that he/she belongs to. As an example emergency services offered users like firemen, ambulance crew etc. can be grouped under one segment. Similarly users frequently accessing web sites offering health care services, hospitals, etc., can be grouped under one segment. These segments can be assigned a high score.

A score may more particularly be formed through combining one or more of the previously mentioned parameters, i.e. different types of data in the session data records. Below an example is given of how a score IS may be determined for an influential user.

The influential user score IS of a user $a_i$ may for instance be determined as $$IS(a_i) = \alpha * Ua_i + \beta * Sa_i + \gamma * Fa_i + \delta * Da_i \text{ for any location } (L_i) \text{ and time } (T_i)$$

where $\alpha$, $\beta$, $\gamma$ and $\delta$ are weights allotted based on the needs of operators. In this case the higher the IS score is, the greater the influence of the user.

The other scores may be formed in a similar manner. Some scores may be formed based on only one parameter. The loyalty score may for instance only be formed based on the length of subscription.

The priority forming unit 36 then forms a priority for each user based on one or more scores, step 63. A priority may be formed based on a single score or a combination of different scores. A priority P may, for instance, be calculated as:

$$P(a_i) = F(LS(a_i), IS(a_i), AS(a_i), CS(a_i), RS(a_i))$$

where
LS is loyalty score
AS is ARPU score
CS is churn score
RS is role score

The above-given priority determination is merely an example. However it is up to the operator to decide which parameters/dimensions can give accurate scores and which score are to be included in determining the priority.

As mentioned above, the priority may be provided to a traffic prioritizing node. As an example it may be provided to the OCS 24.

In the proposed architecture, priorities input from the behavior investigation device 22 to OCS 24 could be any of the above shown scores/segments or a combination of them. OCS 24 can now take appropriate actions/measures during congestion based on what score a user has and the segment to which he or she belongs.

Say, for example, during congestion, OCS 24 may choose to drop some ongoing sessions of low-ARPU users to accommodate few high-ARPU user sessions during this time, in order to maintain the resource utilization. If the resource utilization goes higher where no more new sessions can be allowed, OCS 24 may choose to drop all low-influencer sessions to bring down the resource utilization to normal/acceptable levels so that no interruption shall happen for the ongoing high-value user sessions.

To illustrate the benefits of prioritization, the following comparison is made of the handling of congestion in an OCS without and with prioritizing, where in the prioritizing a priority is based on a single score. When there is no prioritization, load regulation in the OCS is as shown below. If the CPU/Memory utilization crosses 60% during a sampling interval, then 70% of the incoming new session requests are rejected (means only allow 30% of new sessions along with existing sessions)

TABLE 1

| System resource usage (per levels of congestion) | % of rejections per type of traffic in a given period |
|---|---|
| >60% | 70% of new sessions |
| >70% | 100% of new sessions |
| >80% | 50% of ongoing sessions |

With the above configuration in place, upon reaching congestion level where 70% of the traffic is to be rejected, OCS 24 serves the first three out of ten (window-size) requests received and rejects the remaining seven on a First Come First Serve (FCFS) basis. Assuming that there are four highly valued end-users in a single window, the implementation of OCS without prioritizing never assures that those four are preferred over other users in the network during times of congestion.

TABLE 2

| 1 | 2 | 3 | 4 | 5 | 6 | 7 | 8 | 9 | 10 |
|---|---|---|---|---|---|---|---|---|---|
| M | L | H | H | M | H | M | L | H | L |
| S | S | S | R | R | R | R | R | R | R |

L—Low,
M—Medium,
H—Highly valued end-users
S—Served,
R—Rejected

It can be seen that only one out of the four highly valued end-users is served in the above mentioned scenario. Even if the rejection rate is 50%, it is not very certain that all the four high-priority users new session establishment requests are accepted by OCS 24 all the time.

Similarly, if CPU/Memory utilization crosses 80% during the sampling interval, then 50% of the ongoing sessions must be cleaned up. In this situation, there is no real logic defining which sessions to cleanup in-order to bring down resource utilization. When instead applying prioritizing of the users, the following load regulation scheme could be used:

TABLE 3

| System resource usage (per levels of congestion) | High value user rejection criteria |
|---|---|
| >60% | Reject 70% of new user sessions whose score is <0.65 |
| >70% | Reject 100% of new user sessions whose score is <0.75 |
| >80% | Reject 100% of new user sessions whose score is <0.9 && Cleanup 50% of the existing sessions whose score is <0.75 |

With the modification to the load regulation algorithm as shown above, the same OCS 24 behaved in a quite intelligent manner as below. Since the user-value score (calculated by the behavior investigating device) is supplied to the OCS, it has been empowered with the capability to differentiate between requests based on the value of users in the network

TABLE 4

| 1 | 2 | 3 | 4 | 5 | 6 | 7 | 8 | 9 | 10 |
|---|---|---|---|---|---|---|---|---|---|
| M | L | H | H | M | H | M | L | H | L |
| 0.59 | 0.27 | 0.68 | 0.71 | 0.55 | 0.66 | 0.61 | 0.32 | 0.80 | 0.44 |

TABLE 4-continued

| 1 | 2 | 3 | 4 | 5 | 6 | 7 | 8 | 9 | 10 |
|---|---|---|---|---|---|---|---|---|---|
| R | R | S | S | R | S | R | R | S | R |

L—Low,
M—Medium,
H—Highly valued end-users
S—Served,
R—Rejected

It is very evident that the OCS 24 reacted relatively better given the same condition where resource usage is >60% and the trigger is to reject 70% of new user session requests whose influencer score is <0.65. In normal case, OCS must reject 7 out of 3 incoming requests at this trigger, as it did in the example without prioritization. However, OCS accepted 4 incoming requests during the period and rejected only 6 requests when prioritizing was performed. This is due to the fact that during that period there happens to be 4 high value users requesting new session establishment. Hence, OCS did secure the user experience of these high-value users with the new scheme in place.

In a subsequent period, it might happen that all new session establishments are from low-value users. In such case, OCS may choose to reject all of them to secure resource utilization.

In the above given examples, a straightforward case of regulating load based on one score was shown. However, as was disclosed above, the scheme can be enhanced further by taking different other dimensions of the user to have more complex rules as well (ex; combining all user-values scores).

Furthermore, as was mentioned earlier it is possible to provide all priorities to a traffic prioritizing node at once and then regularly update the priorities or one-by-one on request: The first way is also termed a batch processing scheme, while the second is a real-time fetching scheme. In the batch processing scheme priorities are provided to traffic prioritizing nodes at periodic intervals In this scheme, the behavior investigating device 22 takes a snapshot of all (first time) user identities (MSISDN) together with their priorities and dumps them into a local file in a predefined format.
  This file may be uploaded to the traffic prioritizing node 42 via file transfer protocol (FTP) into a preconfigured path.
  The traffic prioritizing node 42 upon noticing a file in the path, may load the file into its database.
  When a traffic request is received during congestion state, the traffic prioritizing node will look up the database for priority, optionally keeps it in memory for further use (to avoid database lookup) and takes an appropriate decision.
  the behaviour investigating device computes the new priorities in the next batch run, compares the list with the originally produced list to understand the changed priorities, and produces a file with only changed priorities along with user identities and uploads it to the traffic prioritizing node.
  Now the traffic prioritizing node needs to only update its database (and if needed its cache) for only changed users.
  The advantage of this approach is that the traffic prioritizing node will only add a minimal latency to the request processing due to fetching data from database/in-memory cache.

The real-time fetching scheme may be performed in the following way:

Upon receiving a service request with regard to a user first time, the traffic prioritizing node 42, such as the OCS, goes and fetches the latest priority of that user over a published interface (e.g. based on REpresentational State Transfer (REST)) of the behavior investigating device 22.

The fetched value is stored in a traffic prioritizing node cache to avoid further requests to the traffic prioritizing node for the same user.

The information in the cache must be stored till the user session is alive and if not alive this value must be purged out from memory within a pre-configured time.

An advantage of this approach is that the traffic prioritizing node does not have to maintain a big database.

As was mentioned earlier, it is also possible for the behavior investigating device 22 to simultaneously provide user priorities to all nodes handling traffic, such as to GGSN 18, PCRF 26 and OCS 24. In this way OCS 24, GGSN 18 and PCRF 26 (involved in the chain of rendering a service to end user with right QoS and charge for the same) are hooked onto the behavior investigating device 22 in order to receive the user priorities for effective load regulation.

Advantages of this approach are that every network element looks at the traffic in the same dimension of the priority and makes the right prioritization at times and making right decisions. For example when GGSN 18 is overloaded, it will also choose to reject the traffic related to low-value-users (e.g. score <0.65) while still serving high-value users.

Figure 9:
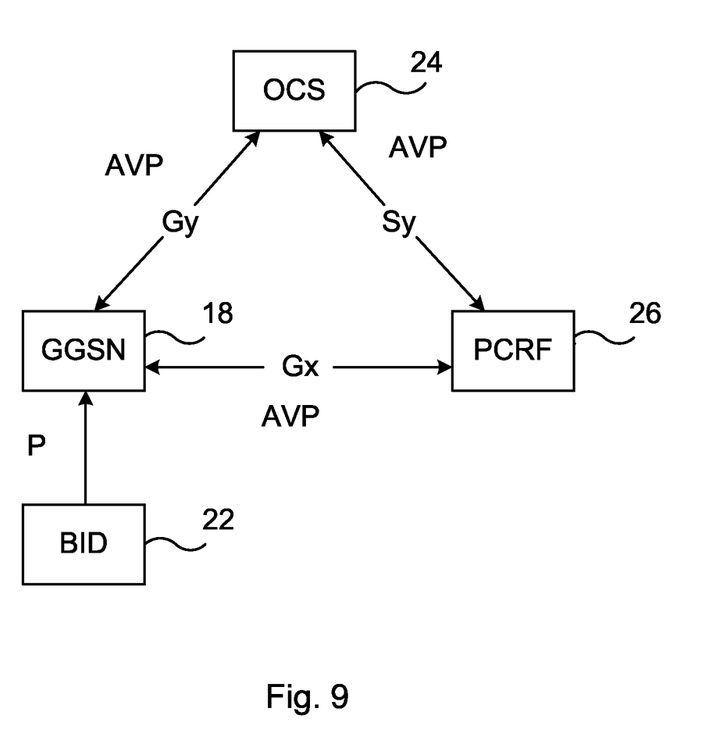

A centralized approach where one traffic handling node is in charge will now be described, with reference being made to FIG. 9, which schematically shows the behavior investigating device communicating with the GGSN 18, which in turn communicates with the OCS 24 and PCRF 26 and where the OCS 24 and PCRF 26 also communicate with each other.

In the centralized approach, the behavior investigating device 22 may be hooked onto the network element that is the source of the traffic. In this case, the behavior investigating device 22 is hooked onto GGSN 18, as it is the one receiving traffic from radio access network and is responsible for initiating charging and policy sessions with PCRF 26 and OCS 24.

Figure 10:
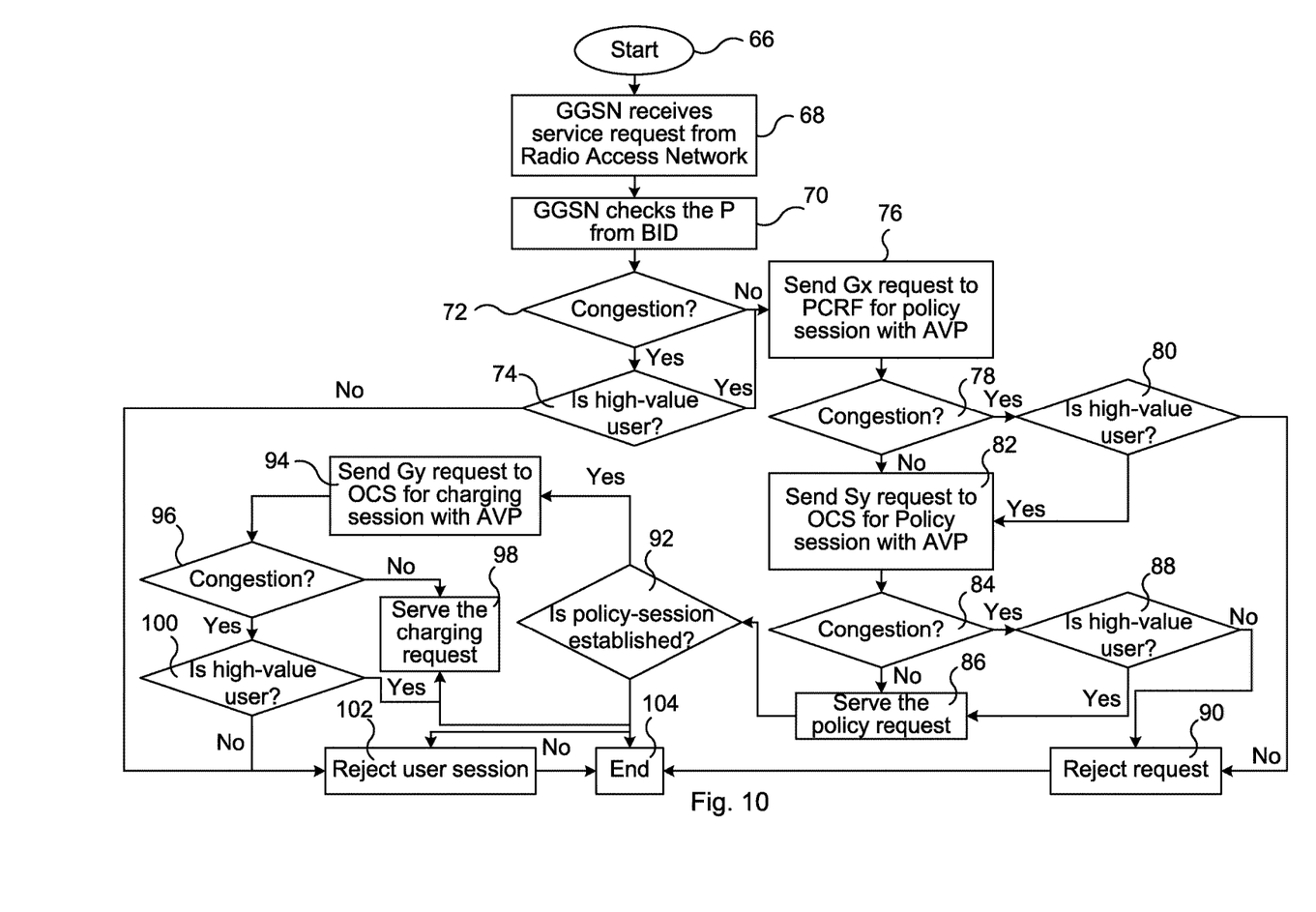
FIG. 10 shows a flow chart of a method of prioritizing traffic for the nodes in FIG. 9.

The way this approach operates will now also be described with reference being made to FIG. 10, which shows a flow chart comprising a number of method steps.

After the method is started, step 66, the GGSN 18, upon receiving a service request from the radio access network in relation to a user, such as the first user U1, step 68, obtains the corresponding priority, step 70. It then enriches the request (irrespective of whether it is in an overload state or not) with the priority. The GGSN 18 then investigates whether it experiences congestion. If it does, step 72, then the GGSN 18 investigates the priority. In case the priority is low, step 74, then the user session is rejected, step 102, and the method is ended, step 104. However, if the priority is high, step 74, as well as if there was no congestion, step 72, a Gx request, i.e., a request over the Gx interface between the GGSN 18 and PCRF 26, is sent to the PCRF 26, step 76. The priority may in this case be provided together with a user identifier, such as the MSISDN, in an Attribute Value Pair (AVP).

This AVP may then be included in the Gx request towards the PCRF 26 while establishing a policy-session. The PCRF 26 in turn investigates if it experiences congestion. If it does, step 78, i.e. if it is in overload situation, it considers this AVP value along with the own load regulation algorithm configurations to take an appropriate decision. If PCRF 26 decides to accept the request, which happens if the priority is high, step 80, the AVP is transparently sent over to OCS 24 in a Sy request step 82, i.e. in a request concerning a policy session sent from the PCRF 26 to the OCS 24 via the Sy interface. The same thing will happen if the PCRF 26 did not experience congestion, step 78. However, if the priority was found to be too low, step 80, then the PCRF 26 rejects the request, step 90, and the method is ended, step 104.

A similar approach shall be taken by the OCS 24 based on the AVP value. In case the OCS after having received the Sy request finds that it experiences congestion, step 84, it continues and investigates the priority. If it also finds that the priority is too low, step 88, the request is rejected, step 90, and the method is ended, step 104. However, in case there was no congestion, step 84, or the priority was high, step 88, the policy request is served by the OCS 24, step 86. If the policy session is not successfully established, step 92, then the method is ended, step 104. However if the policy session is successfully established, step 92, then GGSN 18 will initiate a charging session towards the OCS 24. When the policy session is established, the OCS 24 shall also send the AVP value to the GGSN 18 in the response path so that the responses are not dropped by the network elements due to overload. During this process, both PCRF 26 and OCS 24 may need to cache the AVP information along with other session data for further use till user-session is active.

When there is a successfully established policy session, the GGSN 18 will send a Gy request to the OCS 24, i.e., a request over the Gy interface for a charging session, step 94, where again an AVP is included in the request. The priority may here have been updated since the request for a policy session was made. Therefore, the OCS 24 will update the cached AVP with the new value if different and then proceed with the request handling. The OCS 24 will then investigate whether it is experiencing congestion. If it is, step 96, then the OCS 24 investigates the priority. If the priority is too low, step 100, then the request is rejected, step 102, and the method ended, step 104. However, in case the priority was high, step 100, or there was no congestion, step 98, then the OCS 24 serves the charging request, step 98.

The cached AVP value is useful when OCS 24 needs to send a re-authorization (RAR) request to PCRF 26 or GGSN 18 (depending on if a re-authorization is for policy session or charging session). OCS 24 can prioritize the traffic accordingly and shall include the cached AVP to downstream systems.

By having the above-described information exchange, the need for having local information of priorities at every network element is removed. Also, this is efficient in that caching of the information will only happen for those users whose sessions are active.

The use of priorities can also be applied for traditional core network services such as traditional Voice and messaging Services using the MSC 19. In a centralized approach, MSC 19 gets the priority from the behavior investigating device 22. When MSC 19 is in congestion state, the priority can be used to determine if a user is to be allowed or disallowed the use of a service. MSC 19 may also add the priority in messages to the downstream systems as 'Extension Parameters' so that systems like OCS 24 can also make the right decision if in congestion.

Figure 11:
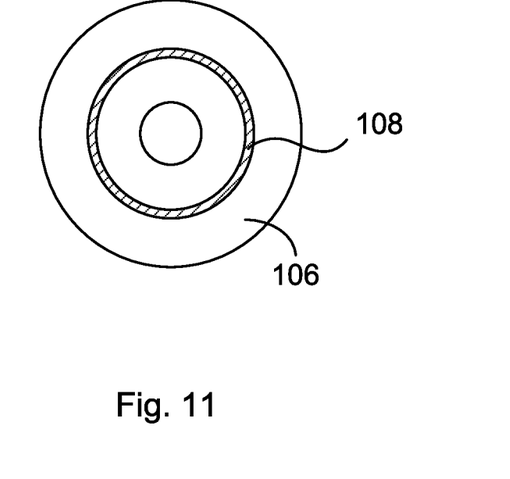
FIG. 11 shows a computer program product comprising a data carrier with computer program code for implementing the functionality of the behavior investigating device.

The computer program code of a system investigating device may be in the form of computer program product for instance in the form of a data carrier, such as a CD ROM disc or a memory stick. In this case the data carrier carries a computer program with the computer program code, which will implement the functionality of the above-described behavior investigating device. One such data carrier 106 with computer program code 108 is schematically shown in FIG. 11.

Figure 12:
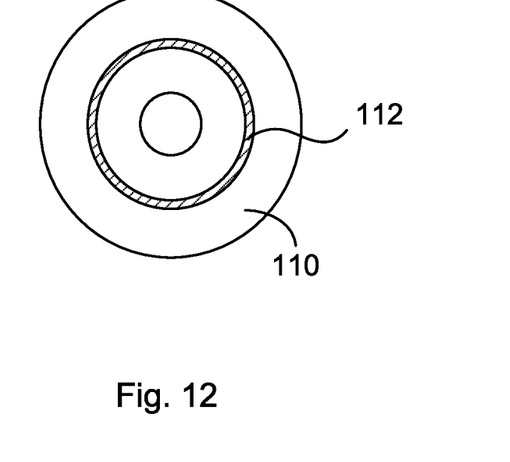
FIG. 12 shows a computer program product comprising a data carrier with computer program code for implementing the functionality of the traffic prioritizing node.

Also, the computer program code of a traffic prioritizing node may be in the form of computer program product for instance in the form of a data carrier, such as a CD ROM disc or a memory stick. In this case the data carrier carries a computer program with the computer program code, which will implement the functionality of the above-described traffic prioritizing node. One such data carrier no with computer program code 112 is schematically shown in FIG. 12.

The score forming unit may be considered to form means for continuously obtaining statistical network usage data of users in the communication network and means for analyzing the statistical network usage data with regard to the pattern of behavior of the users. The priority forming unit may in turn be considered to form means for prioritizing the users based on the analysis and the priority informing unit may be considered to form means for informing a traffic prioritizing function about the priority of at least one of the users in order for the traffic prioritizing function to allow or disallow the user to use the communication network when it is congested.

The means for informing a traffic prioritizing function about the priority of at least one of the users of the priority informing unit may furthermore be considered to form means for sending data about priorities at regular recurring intervals. The means for sending data may furthermore comprise means for sending an initial set with the priorities of all the users and thereafter sending updates of the set.

The means for informing a traffic prioritizing function about the priority of at least one of the users of the priority informing unit may furthermore be considered to form means for receive a request for priority concerning a user from the traffic prioritizing function and responding to the request with the priority.

The means for analyzing the statistical network usage data with regard to the pattern of behavior of a user of the score forming unit may be considered to comprise means for fetching statistical network usage data from session data records and means for forming a score as a combination of different types of data in the session data records. The means for prioritizing the users based on the analysis may be considered to comprise means for forming a priority for the user based on the score.

The means for forming a priority based on a score may furthermore be considered to form means for forming the priority as a combination of different scores.

The means for informing a traffic prioritizing function about the priority of at least one of the users may further be considered to form means for informing each traffic prioritizing node.

The congestion determining unit may be considered to form means for determining that there is network congestion and the session control unit may be considered to form means for identifying a communication session of a user in the communication network, means for obtain a priority of the user from a behavior investigating device and means for determining whether the user is to be allowed to use the communication network based on the priority and the congestion determination.

The means for identifying a communication session may be consider to comprise means for obtaining a request to use the communication network from the user and means for investigating the priority in relation to this request.

The means for identifying a communication session may also be considered to form means for investigating a priority in relation to an ongoing session.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

What is claimed is:

1. A traffic prioritizing node in a communication network, the traffic prioritizing node comprising:
   a processor, and
   a memory circuit storing computer instructions for execution by the processor,
   whereby said traffic prioritizing node is configured to:
   determine that there is network congestion;
   identify a communication session of a user in the communication network;
   obtain a user-value score of the user from a behavior investigating device, said user-value score indicating a value of the user to the communication network and said user-value score having been determined based on a pattern of behavior of the user obtained through analysis of statistical network usage data;
   determine whether the user is to be allowed to use the communication network based on the user-value score and the network congestion determination, by comparing the user-value score to a user-value score threshold that varies with respect to a level of the network congestion; and
   allow or disallow the communication session of the user, responsive to whether it is determined that the user is allowed to use the communication network.

2. The traffic prioritizing node according to claim 1, wherein the session is a new session to be set up and the traffic prioritizing node is configured to detect the session through obtaining a request to use the communication network from the user, investigate the user-value score in relation to this request and determine whether the session may be initiated.

3. The traffic prioritizing node according to claim 1, wherein the session is an ongoing session handled by the node and the traffic prioritizing node is configured to investigate the user-value score in relation to this ongoing session and determine whether the session is allowed to continue.

4. The traffic prioritizing node according to claim 1, wherein said statistical network usage data comprises one or more of:
   statistical network usage data for communications with other users in a social network of the user, and identities of the other users in the social network of the user, indicating an influence of the user; and
   statistical network usage data for other users that follow the user in a social network, and a number of the other users, indicating an influence of the user.

5. The traffic prioritizing node according to claim 1, wherein said user-value score is determined based on statistical network usage data for communications with other users, wherein identities or contact information of the other users indicate that the other users are medical and emergency services personnel.

6. The traffic prioritizing node according to claim 1, wherein said user-value score is determined based on one or more of:

how long the user has used network services of the operator of the communication network; and how much the user has spent on a particular service.

7. The traffic prioritizing node according to claim 1, wherein said user-value score is based on a level of churn indicated by the pattern of behavior of the user.

8. A method of prioritizing traffic in a communication network, the method being performed in a traffic prioritizing node and implementing a traffic prioritizing function, the method comprising:

determining that there is network congestion;

identifying a communication session of a user in the communication network;

obtaining a user-value score of the user from a behavior investigating device, said user-value score indicating a value of the user to the communication network and said user-value score having been determined based on a pattern of behavior of the user obtained through analysis of statistical network usage data;

determining whether the user is to be allowed to use the communication network based on the user-value score and the network congestion determination, by comparing the user-value score to a user-value score threshold that varies with respect to a level of the network congestion; and allowing or disallowing the communication session of the user, responsive to whether it is determined that the user is allowed to use the communication network.

9. The method according to claim 8, wherein the session is a new session to be set up and the identifying of the communication session comprises obtaining a request to use the communication network from the user and investigating the user-value score in relation to this request and the determining comprises determining whether the session may be initiated.

10. The method according to claim 8, wherein the session is an ongoing session handled by the node and the investigation comprises investigating the user-value score in relation to this ongoing session and the determining comprises determine whether the session is allowed to continue.

11. A non-transitory computer-readable medium comprising, stored thereupon, a computer program product for prioritizing traffic in a communication network, the computer program product comprising computer program code that, when run in a traffic prioritizing node in the communication network, causes the traffic prioritizing node to implement a traffic prioritizing function configured to:

determine that there is network congestion;

identify a communication session of a user in the communication network;

obtain a user-value score of the user from a behavior investigating device, said user-value score indicating a value of the user to the communication network, and said user-value score having been determined based on a pattern of behavior of the user obtained through analysis of statistical network usage data;

determine whether the user is to be allowed to use the communication network based on the user-value score and the network congestion determination, by comparing the user-value score to a user-value score threshold that varies with respect to a level of the network congestion; and allow or disallow the communication session of the user, responsive to whether it is determined that the user is allowed to use the communication network.

* * * * *